United States Patent
Hasumi et al.

(10) Patent No.: US 11,242,824 B2
(45) Date of Patent: Feb. 8, 2022

(54) FUEL ADSORPTION DEVICE AND EVAPORATED FUEL PROCESSING APPARATUS INCLUDING THE SAME

(71) Applicants: Mahle International GmbH, Stuttgart (DE); Mahle Filter Systems Japan Corporation, Tokyo (JP)

(72) Inventors: Takashi Hasumi, Tokyo (JP); Hiroshi Iwauchi, Tokyo (JP); Junpei Omichi, Tokyo (JP); Yuya Yamashita, Tokyo (JP)

(73) Assignee: Mahle International GmbH

( * ) Notice: Subject to any disclaimer, the term of this patent is extended or adjusted under 35 U.S.C. 154(b) by 0 days.

(21) Appl. No.: 17/133,596

(22) Filed: Dec. 23, 2020

(65) Prior Publication Data

US 2021/0199072 A1 Jul. 1, 2021

(30) Foreign Application Priority Data

Dec. 25, 2019 (JP) .............................. JP2019-234228

(51) Int. Cl.
*F02M 25/08* (2006.01)
*B60K 15/035* (2006.01)

(52) U.S. Cl.
CPC ... *F02M 25/0854* (2013.01); *B60K 15/03504* (2013.01); *B60K 2015/03514* (2013.01); *F02M 2025/0881* (2013.01)

(58) Field of Classification Search
CPC ....... F02M 25/0854; F02M 2025/0881; B60K 15/03504; B60K 2015/03514
See application file for complete search history.

(56) References Cited

U.S. PATENT DOCUMENTS

| 10,495,031 B2 | 12/2019 | Omichi et al. |
| 2004/0094132 A1* | 5/2004 | Fujimoto ............... F02M 25/08 123/519 |
| 2008/0041226 A1* | 2/2008 | Hiltzik ............... F02M 25/0854 95/90 |

(Continued)

FOREIGN PATENT DOCUMENTS

| JP | 201231783 A | 2/2012 |
| JP | 2017-106384 A | 6/2017 |

OTHER PUBLICATIONS

English abstract for JP-201231783.

*Primary Examiner* — Xiao En Mo
(74) *Attorney, Agent, or Firm* — Fishman Stewart PLLC

(57) ABSTRACT

A fuel adsorption device may include a case and a heater. The case may be metal and may have a multi-cylindrical shape. The case may accommodate a plurality of adsorbents configured to at least one of adsorb and desorb evaporated fuel. The case may include a cylindrical first wall part, at least one cylindrical second wall part disposed further inward than the first wall part, and a plurality of connection parts connecting the first wall part and the at least one second wall part to one other. A first adsorbent of the plurality of adsorbents may be arranged in a first space disposed between the first wall part and the second wall part. A second adsorbent of the plurality of adsorbents may be arranged in a second space disposed further inward than the second wall part. The heater may be disposed on an outer surface of the first wall part.

20 Claims, 15 Drawing Sheets

(56) References Cited

U.S. PATENT DOCUMENTS

| | | | |
|---|---|---|---|
| 2008/0184973 A1* | 8/2008 | Yamazaki | B01D 53/0415 123/519 |
| 2015/0184621 A1* | 7/2015 | Arase | F02M 25/0854 96/131 |
| 2018/0266363 A1* | 9/2018 | Minezawa | B60K 15/03504 |
| 2019/0048834 A1* | 2/2019 | Kim | F02M 37/0052 |

* cited by examiner

FUEL ADSORPTION DEVICE AND EVAPORATED FUEL PROCESSING APPARATUS INCLUDING THE SAME

CROSS-REFERENCE TO RELATED APPLICATIONS

This application claims priority to Japanese Patent Application No. JP 2019-234228, filed on Dec. 25, 2019, the contents of which is hereby incorporated by reference in its entirety.

TECHNICAL FIELD

The present invention relates to a fuel adsorption device that accommodates an adsorbent capable of adsorbing and desorbing evaporated fuel and is used in addition to a main canister, and to an evaporated fuel processing apparatus including the same.

BACKGROUND

An evaporated fuel processing apparatus, which is a canister for a vehicle, suppressing emission of evaporated fuel in a fuel tank into the atmosphere, for example, including an adsorbent, in an automobile fueled by gasoline, has been known.

In the evaporated fuel processing apparatus, evaporated fuel generated in the fuel tank during stop time of a vehicle or the like is adsorbed in activated carbon, which is an adsorbent, while a fuel component (for example, gasoline vapor) is desorbed (purged) from the activated carbon through air from the atmosphere introduced through a drain port communicating with the outside of the vehicle during operation of an internal combustion engine. The desorbed fuel component is enters an inlet system of the internal combustion engine again.

Heating activated carbon in order to improve the desorption efficiency of the fuel component adsorbed in the activated carbon has been known. By heating the activated carbon, the remaining amount of HC (carbon hydride) in the activated carbon after desorption can be suppressed.

For example, an evaporated fuel processing apparatus that includes a housing made of resin, a honeycomb core that accommodates granulated activated carbon, and heaters that heat the activated carbon has been publicly known (for example, see Patent Literature 1).

Furthermore, a buffer canister that includes a housing made of resin, activated carbon accommodated in a housing, and a heater that is embedded in the activated carbon and heats the activated carbon from the inside has been publicly known (for example, see Patent Literature 2). The activated carbon is charged between a plurality of fins formed on the outer periphery of a heater case.

CITATION LIST

Patent Literature

[Patent Literature 1] Japanese Patent Laid-Open No. 2012-31783
[Patent Literature 2] Japanese Patent Laid-Open No. 2017-106384

SUMMARY

Incidentally, in the evaporated fuel processing apparatus in Patent Literature 1, the heaters are provided only on parts of some of cell walls that form the honeycomb core. Sites where heating of the activated carbon by the heaters is insufficient arise.

In the buffer canister in Patent Literature 2, the activated carbon is charged between the plurality of fins having complicated shapes. Accordingly, there is a margin of improving the filling efficiency of the activated carbon. Furthermore, the gaps occur between the activated carbon and the fins of the heater case. There is a margin of improvement also in the heating efficiency of the activated carbon.

Accordingly, the present invention has been made in view of the problems described above, pursuant to the objective of providing a technique that can efficiently charge and heat activated carbon in an evaporated fuel processing apparatus.

To solve the problems described above, a fuel adsorption device according to the present invention is characterized by including: a case, made of metal, having a multi-cylindrical shape, and accommodating a plurality of adsorbents capable of adsorbing and desorbing evaporated fuel; and a heater provided for the case, wherein the case includes: a cylindrical first wall part; at least one cylindrical second wall part disposed further inward than the first wall part; and connection parts connecting the first wall part and the second wall part to each other, one adsorbent among the plurality of adsorbents is provided in a first space between the first wall part and the second wall part, and another adsorbent among the plurality of adsorbents is provided in a second space further inward than the second wall part, and the heater is provided on an outer surface of the first wall part.

According to this aspect, charging of the adsorbents can be facilitated by the simple configuration of the case, and the wall parts are connected to each other by connection parts. Consequently, the heating efficiency of each adsorbent can be improved. Accordingly, desorption of the fuel component adsorbed in the adsorbents is facilitated, and emission of the fuel component to the atmosphere can be suppressed.

The connection parts may be provided at positions facing each other. According to this mode, a heating path for the other adsorbent disposed apart from the heater is additionally provided, and two first spaces have the same shape, which can simplify the design of the case and the one adsorbent.

The heater may be provided at a position which is on an outer periphery of the first wall part and to which the connection parts extend. In to this mode, the heat from the heater reaches to the other adsorbent at the minimum distance through the connection parts. Accordingly, the heating efficiency of the other adsorbent is improved.

The connection parts may extend along a longitudinal direction from one end of each of the first wall part and the second wall part to another end thereof. According to this mode, the entire adsorbent accommodated in the case can be efficiently heated.

On a path beginning at a fuel tank of a vehicle and leading to the outside of the vehicle, the first space may be disposed closer to the fuel tank than the second space, and the one adsorbent may have a higher adsorbing performance than the other adsorbent. According to this mode, the adsorbing performance is configured to be appropriately different between the one adsorbent through which evaporated fuel having a high concentration of the fuel component passes first, and the other adsorbent which is nearer to the atmosphere and through which evaporated fuel having a low concentration of the fuel component passes.

Furthermore, to solve the problems described above, an evaporated fuel processing apparatus according to the present invention is characterized by including: a main canister adsorbing and desorbing evaporated fuel from a fuel tank of a vehicle, and a buffer canister communicating with the main canister, and adsorbing and desorbing evaporated fuel from the main canister, wherein the buffer canister includes the fuel adsorption device according to the aspect described above.

According to this aspect, charging of the adsorbents can be facilitated by the simple configuration of the case, and the wall parts are connected to each other by connection parts. Consequently, the heating efficiency of each adsorbent can be improved. Accordingly, desorption of the fuel component adsorbed in the adsorbent is facilitated, and emission of the fuel component to the atmosphere can be suppressed. The environmental contamination due to vehicle traveling can be suppressed.

The present invention can efficiently charge and heat an adsorbent in the evaporated fuel processing apparatus.

DETAILED DESCRIPTION

Preferred embodiments of the present invention are described with reference to the drawings.

A fuel adsorption device according to the present invention is, for example, a buffer canister that accommodates the adsorbent, e.g., activated carbon, and is used additionally to the main canister, and is applied to an evaporated fuel processing apparatus. The evaporated fuel processing apparatus to which the fuel adsorption device according to the present invention is applied is not limited to a specific evaporated fuel processing apparatus. For example, a fuel adsorption device 1 according to one embodiment of the present invention is applied to an evaporated fuel processing apparatus shown in FIG. 1.

Figure 1:
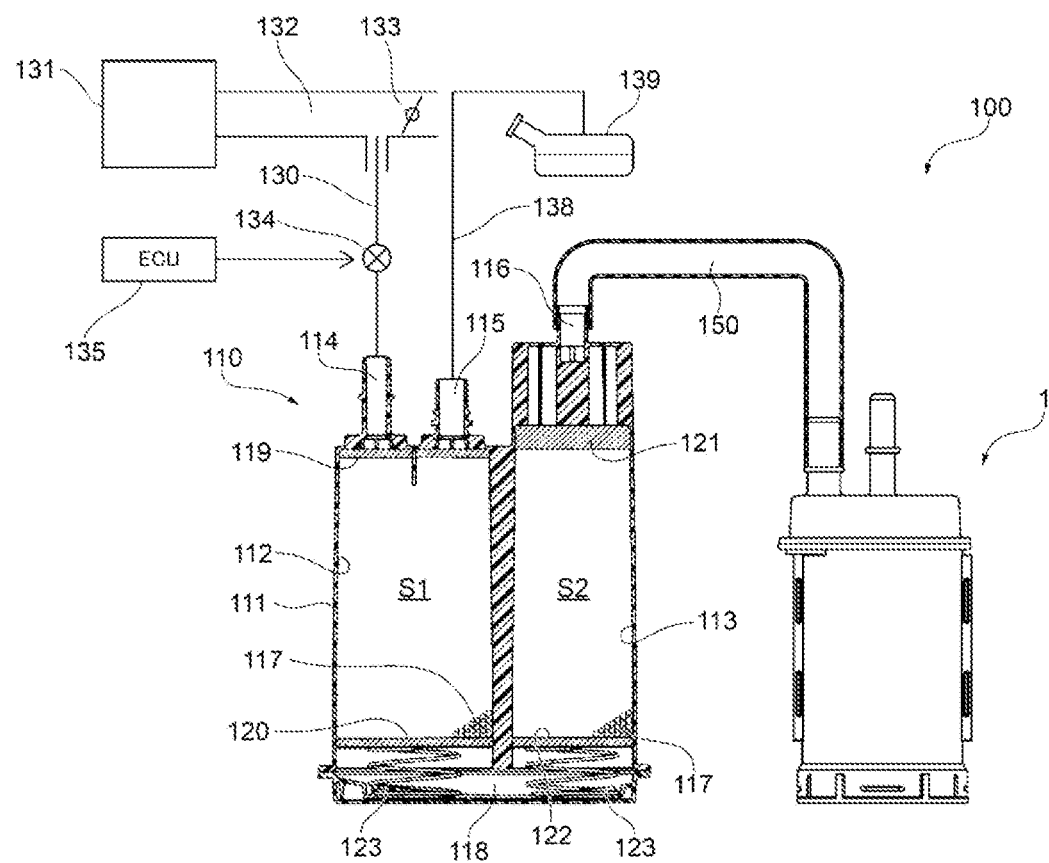
FIG. 1 is a schematic view of an evaporated fuel processing apparatus that includes a fuel adsorption device according to the present invention.

FIG. 1 is a schematic view of the evaporated fuel processing apparatus 1 that includes the fuel adsorption device 1 according to the present invention. The evaporated fuel processing apparatus 100 adsorbs evaporated fuel generated from the inside of a fuel tank during stop time of a vehicle. In vehicles fueled by gasoline, the evaporated fuel processing apparatus 100 suppress emission of evaporated fuel in the fuel tank into the atmosphere. The fuel component adsorbed in the evaporated fuel processing apparatus 100 through air taken during driving of an internal combustion engine is desorbed from the evaporated fuel processing apparatus 100 and combusted in the internal combustion engine.

The evaporated fuel processing apparatus 100, which temporarily accumulates the fuel component, includes a main canister 110, and the fuel adsorption device (hereinafter, also called "buffer canister") 1. The main canister 110 and the buffer canister 1 communicate with each other through a hose 150 that has flexibility.

The main canister 110 is a non-heated area, and the capacity thereof is relatively larger than that of the buffer canister 1. The main canister 110 includes a housing 111 made of synthetic resin. The housing 111 includes two cylindrical parts 112 and 113.

The cylindrical part 112 is formed to have an elongated square tube shape, and includes a purge port 114 and a charge port 115 at one end portion. The purge port 114 communicates with an inlet path 132 of an internal combustion engine 131 through a purge path 130. A throttle valve 133 is arranged at the inlet path 132. The purge port 114 communicates with the inlet path 132 on a downstream side of the throttle valve 133. A purge control valve 134 is interposed in the purge path 130.

The degree of opening of the purge control valve 134 is controlled by an engine control unit 135.

The charge port 115 communicates with a fuel tank 139 of a vehicle through a charge path 138.

The cylindrical part 113 is formed to have an elongated square tube shape, and includes a connection port 116 at one end portion. The two cylindrical parts 112 and 113 are connected to each other with a slight gap therebetween.

The cylindrical part 112 and the cylindrical part 113 communicate with each other through a connection path 118 at another end. Accordingly, a U-shaped inner capacity, i.e., a flow path, communicating with the inside of the housing 111 is formed. The insides of the cylindrical parts 112 and 113 are filled with activated carbon 117 that is granulated. The activated carbon 117 is an adsorbent capable of adsorbing and desorbing the fuel component.

At one end of the cylindrical part 112, a screen member 119 having air permeability is provided. At another end of the cylindrical part 112, a screen member 120 having air permeability is provided. The screen member 120 partitions an internal space 51 of the cylindrical part 112 and the connection path 118 off from each other. In the cylindrical part 112, the internal space 51 is filled with the activated carbon 117.

At one end of the cylindrical part 113, a screen member 121 having air permeability is provided. At another end of the cylindrical part 113, a screen member 122 having air permeability is provided. The screen member 122 partitions an internal space S2 of the cylindrical part 113 and the connection path 118 off from each other. In the cylindrical part 113, the internal space S2 is filled with the activated carbon 117.

The screen members 120 and 122 of the cylindrical parts 112 and 113 are supported by porous plates (not shown) from a side closer to the connection path 118. The connection path 118 is provided with two springs 123 in a compressed state. The springs 123 urge the porous plates and the screen members 120 and 122 toward the respective screen members 119 and 121. Accordingly, the activated carbon 117 is compressed.

The activated carbon 117 used in the main canister 110 is not specifically limited. However, for example, typical activated carbon having a butane working capacity (BWC) of 11.0 g/dL is used. Note that types of activated carbon having characteristics that differ between the cylindrical parts 112 and 113 may be used.

Figure 2:
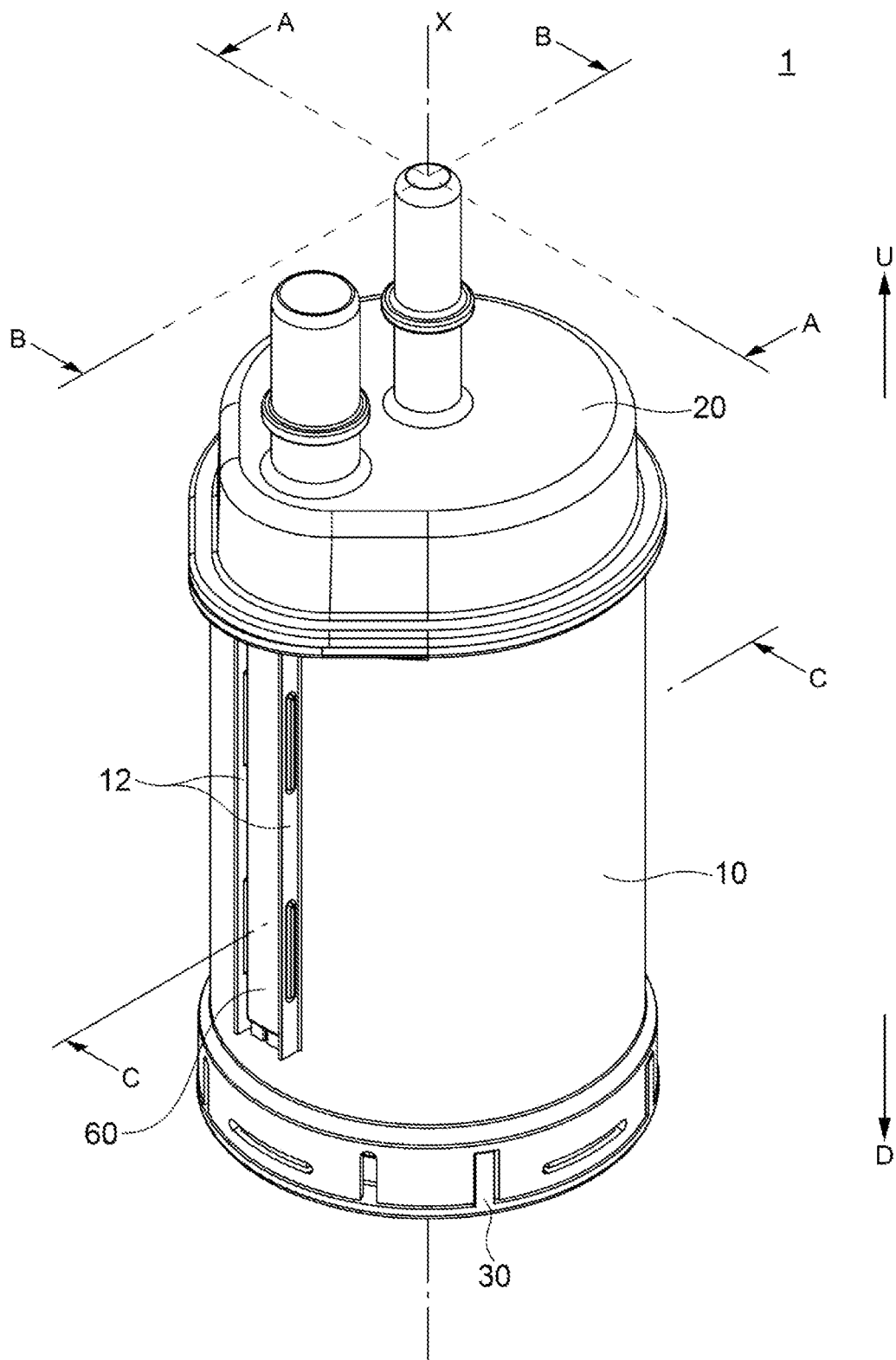
FIG. 2 is a perspective view of a buffer canister.

The buffer canister 1 is externally attached to the housing 111 of the main canister 110 having the configuration described above. FIG. 2 is a perspective view of the buffer canister 1. For the sake of convenience of description, at the buffer canister 1, a side at which connection to the main canister 110 is made (a side to which the hose 150 is connected) is assumed to be an "upward U", and a side opposite to the side of connection to the main canister 110 is assumed to be a "downward D".

Figure 3A:
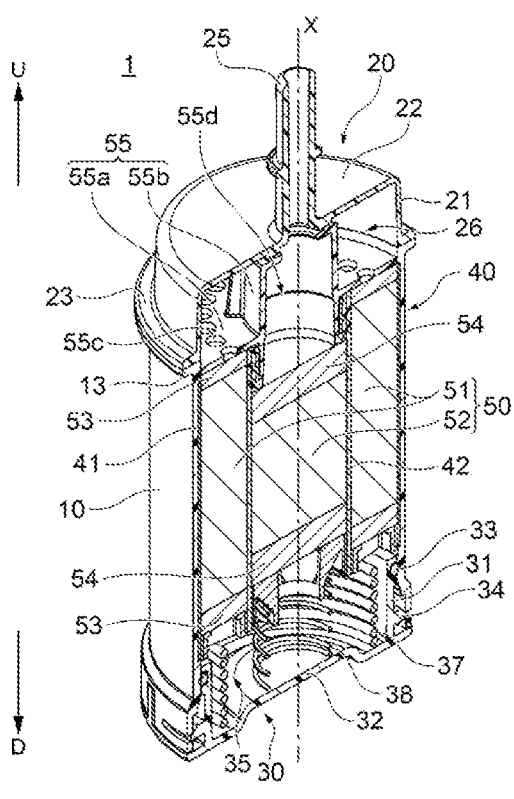
FIG. 3A is a longitudinal sectional view of the buffer canister taken along line A-A shown in FIG. 2.
Figure 3B:
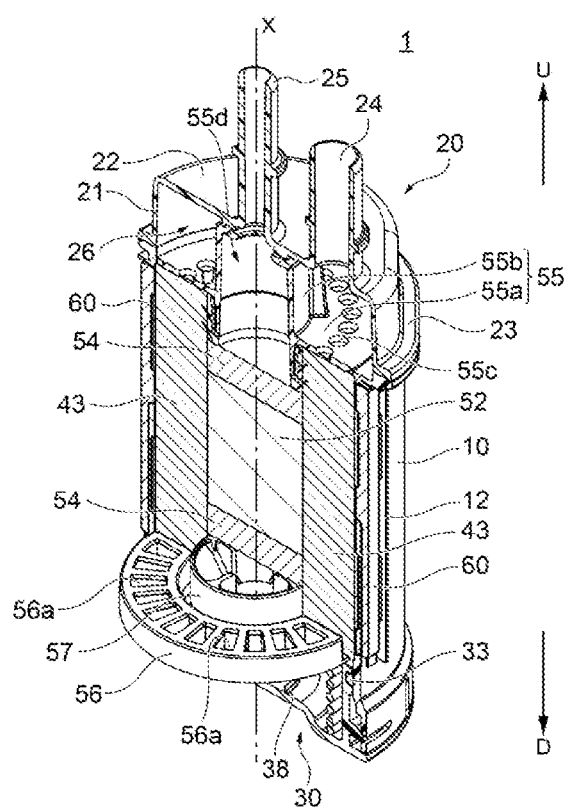
FIG. 3B is a longitudinal sectional view of the buffer canister taken along line B-B shown in FIG. 2.

FIG. 3A is a longitudinal sectional view of the buffer canister 1 taken along line A-A shown in FIG. 2, and FIG. 3B is a longitudinal sectional view of the buffer canister 1 taken along line B-B shown in FIG. 2. The buffer canister 1 according to the present embodiment includes: a cylindrical housing 10 whose opposite ends can be closed; a case 40 that is multi-cylindrical, made of metal, accommodated in the housing 10, and accommodates a plurality of adsorbents (hereinafter, also called "activated carbon") 50 capable of adsorbing and desorbing evaporated fuel; and heaters 60 provided in the case 40. The case 40 includes: a cylindrical first wall part (hereinafter, also called "outer wall part") 41; at least one cylindrical second wall part (hereinafter, also called "inner wall part") 42 disposed further inward than the first wall part 41; and connection parts (hereinafter, also called "connection wall parts") 43 that connect the first wall part 41 and the second wall part 42 to each other. One adsorbent (hereinafter, also called "outer activated carbon") 51 among the adsorbents 50 is provided in a first space (hereinafter, also called "outer space") 44 between the first wall part 41 and the second wall part 42. Another adsorbent (hereinafter, also called "inner activated carbon") 52 among the adsorbents 50 is provided in a second space (hereinafter, also called "inner space") 44 disposed further inward than the second wall part 42. The heaters 60 are provided on the first wall part 41. Hereinafter, the configuration of the buffer canister 1 is specifically described.

The buffer canister 1 includes the housing 10, two covers 20 and 30, the case 40, the activated carbons 50 and the heaters 60. End portions of the housing 10 that open upward U and downward D are closed with the respective covers 20 and 30.

Figure 4:
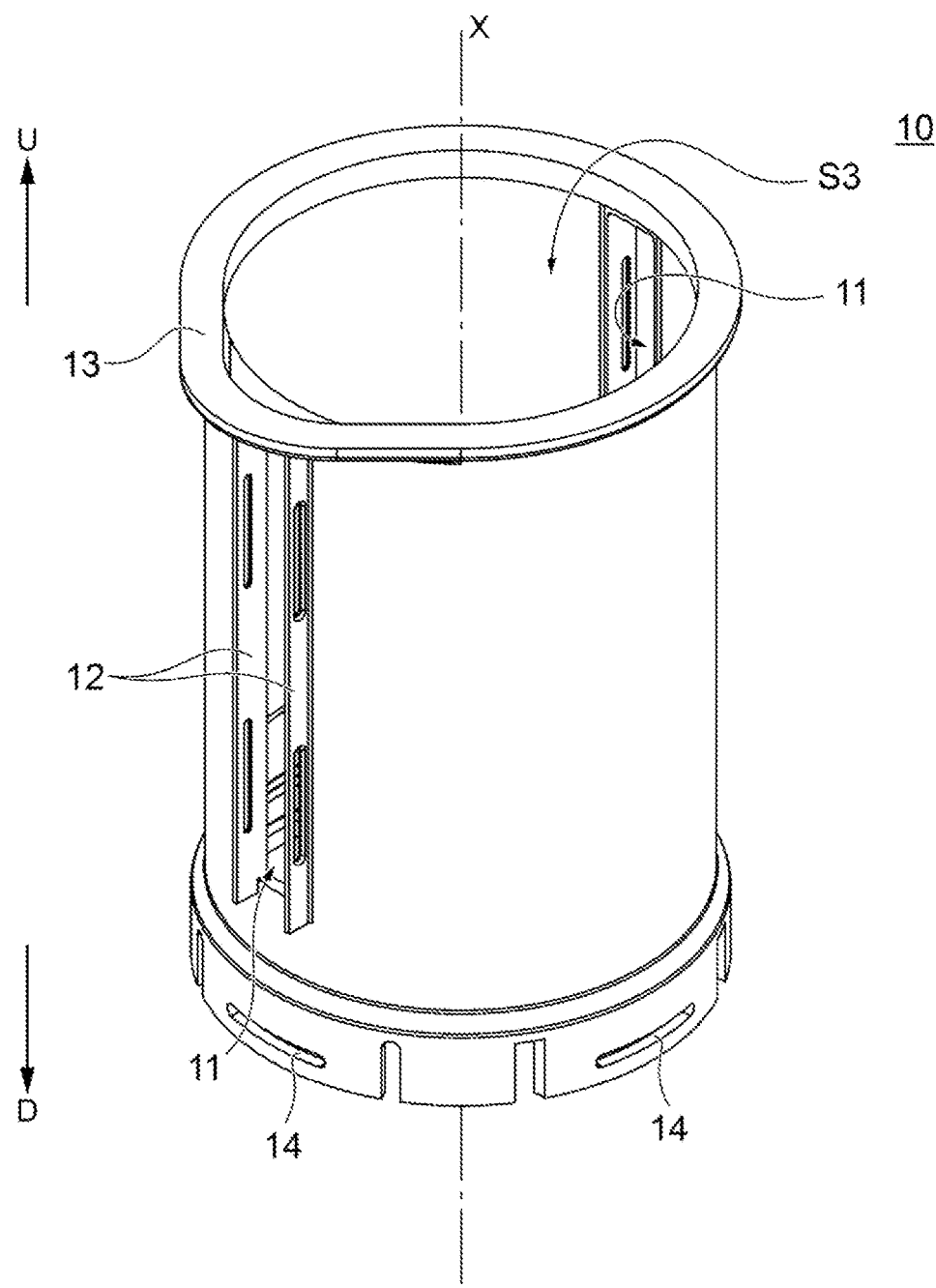
FIG. 4 is a perspective view of a housing of the buffer canister.

FIG. 4 is a perspective view of the housing 10 of the buffer canister 1. The housing 10 is formed of synthetic resin to have a cylindrical shape. The housing 10 defines a storage space S3 that accommodates the case 40 around an axis x.

The housing 10 has two slit-shaped openings 11. The openings 11 are provided at positions facing each other in a radial direction. The openings 11 extend along the axis x. The openings 11 are formed to have a substantially rectangular shape in a plan view. The case 40 accommodated in the housing 10 is exposed at the openings 11.

The housing 10 includes a pair of ribs 12. The ribs 12 extend along edges of the openings 11 along an x axis. The ribs 12 extend outward in the radial direction from the outer periphery of the housing 10. The heater 60 is accommodated in an area defined by the ribs 12.

The housing 10 includes a flange part 13 at the upward U end. The flange part 13 annularly extends along the outer periphery, and extends outward in the radial direction.

The cover 20 is attached to the housing 10 on the upward U side (hereinafter, also called "upper cover"). The upper cover 20 includes a peripheral wall part 21, and ceiling wall part 22. The peripheral wall part 21 extends along the flange part 13 of the housing 10, and extends along the axis x.

The peripheral wall part 21 includes a flange part 23 at a peripheral edge closer to the housing 10. The flange part 23 annularly extends along the peripheral edge of the peripheral wall part 21, and extends outward in the radial direction from the peripheral wall part 21. The cover 20 is vibration-welded, at the flange part 23, to the flange part 13 of the housing 10.

The ceiling wall part 22 is provided at an end portion of the peripheral wall part 21 that is opposite the flange part 23. The ceiling wall part 22 includes a charge port 24 and a purge port 25. The charge port 24 is at a position eccentric from the axis x. The charge port 24 is a cylindrical portion extending in an upward U. The charge port 24 communicates, at the downward D end portion, with the inside of the upper cover 20. The hose 150 communicates with the charge port 24.

The purge port 25 is formed at the center of the ceiling wall part 22, and is provided on the axis x. The purge port 25 is a cylindrical portion extending in an upward U. The purge port 25 communicates, at the downward D end portion, with the inside of the upper cover 20. The buffer canister 1 communicates with the atmosphere through the purge port 25. In a state where the upper cover 20 is attached to the housing 10, the upper space 26 is defined by the peripheral wall part 21 and the ceiling wall part 22.

The cover 30 is attached to the housing 10 on the downward D side (hereinafter, also called "lower cover"). The lower cover 30 includes a peripheral wall part 31, and a bottom wall part 32.

The peripheral wall part 31 is pressed into the housing 10 from the downward D opening of the housing 10. The peripheral wall part 31 includes a seal ring 33 and a plurality of projection parts 34. The seal ring 33 is accommodated in an annular recessed part formed in the peripheral wall part 31. The projection parts 34 are provided downward D from the seal ring 33. The projection parts 34 are partially formed, centered at the axis x, in the circumferential direction of the peripheral wall part 31. The projection parts 34 are engaged with slits 14 formed at the downward D end portion of the housing 10.

The bottom wall part 32 is provided at the downward D end portion of the peripheral wall part 31. The bottom wall part 32 extends in the radial direction from the outer periphery of the peripheral wall part 31. In a state where the lower cover 30 is pressed into the housing 10, a lower space 35 is defined by the peripheral wall part 31 and the bottom wall part 32.

Figure 5:
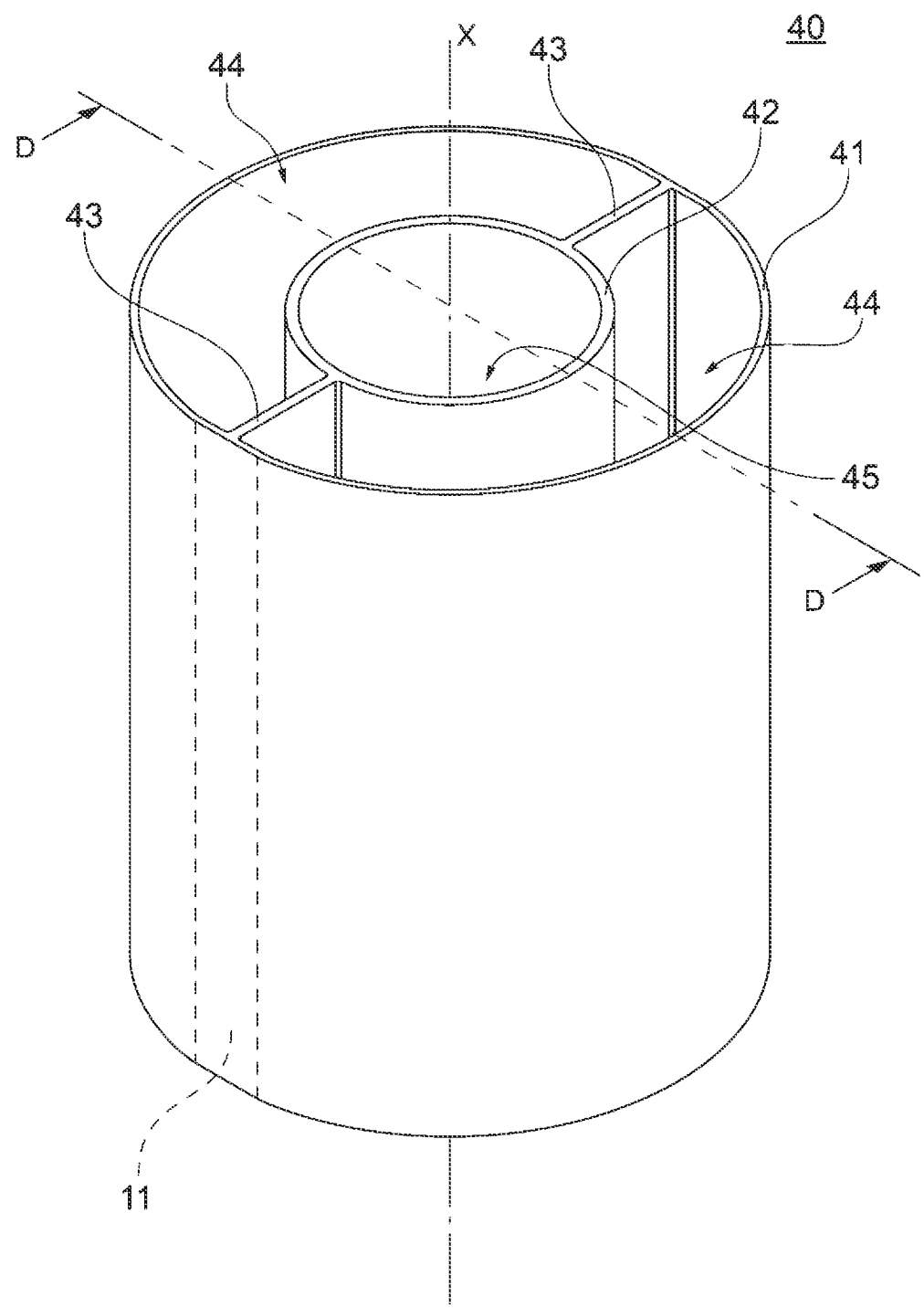
FIG. 5 is a perspective view of a case.
Figure 6:
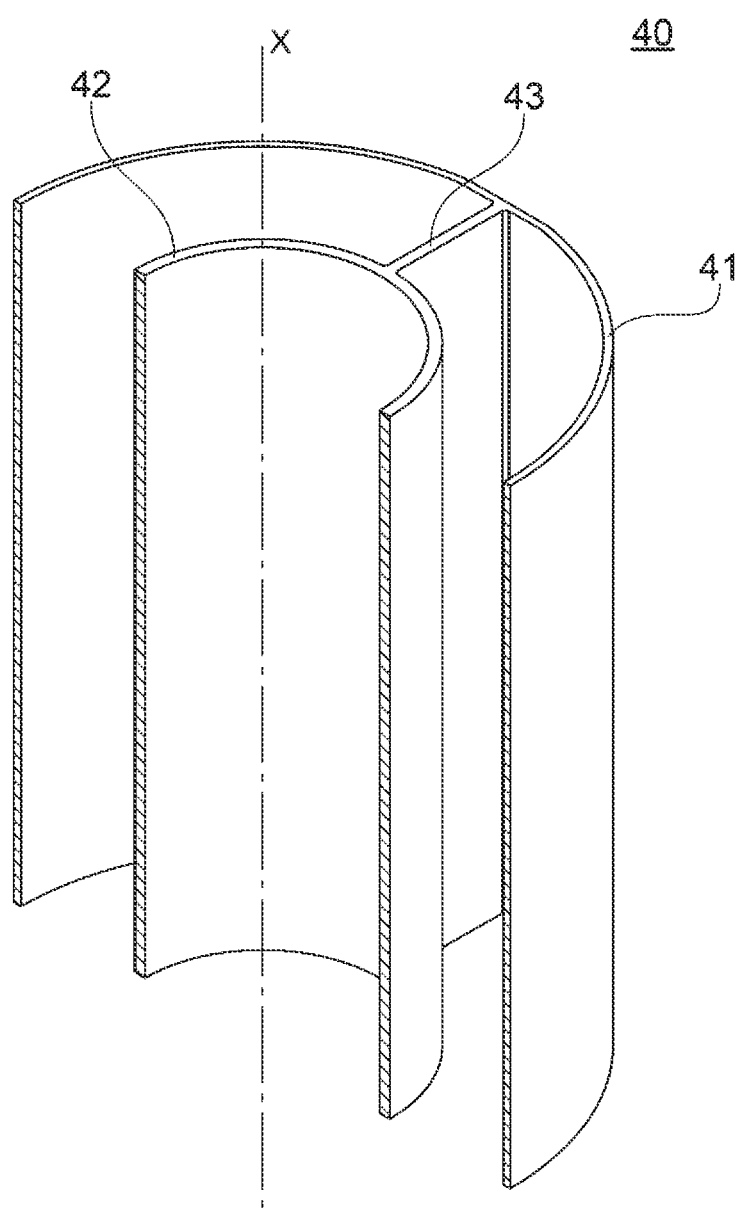
FIG. 6 is a longitudinal sectional view of the case taken along line D-D shown in FIG. 5.
Figure 7:
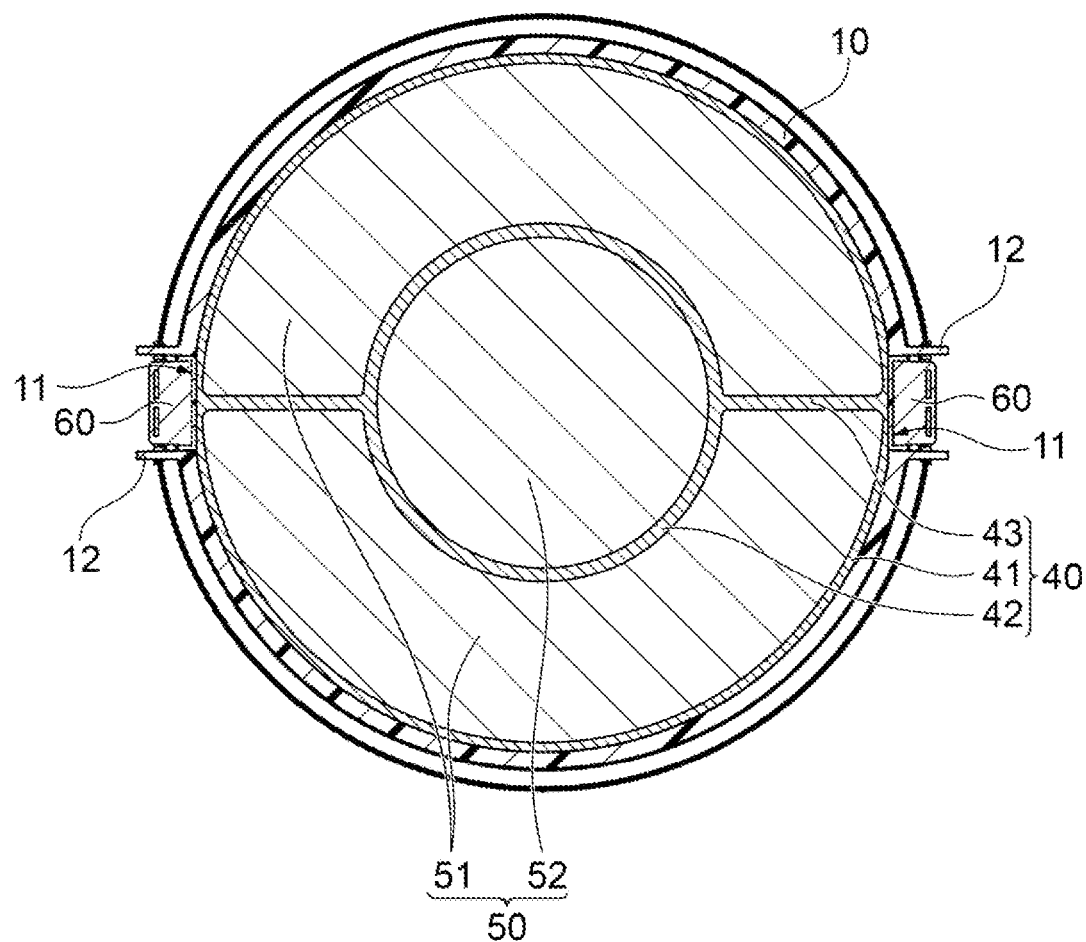
FIG. 7 is a cross-sectional view of the buffer canister taken along line C-C shown in FIG. 2.

The case 40 is formed of a material excellent in thermal conductivity, and is manufactured using aluminum or an aluminum alloy by extrusion molding or the like. FIG. 5 is a perspective view of the case 40. FIG. 6 is a longitudinal sectional view of the case 40 taken along line D-D shown in FIG. 5. FIG. 7 is a sectional view of the buffer canister 1 taken along line C-C shown in FIG. 2. The case 40 has a double cylindrical structure. The case 40 includes an outer wall part 41, an inner wall part 42, and two connection wall parts 43.

The outer wall part 41 and the inner wall part 42 are cylindrically formed. The outer diameter of the outer wall part 41 is larger than the outer diameter of the inner wall part 42. The outer wall part 41 and the inner wall part 42 are arranged concentrically with each other. The outer wall part 41 and the inner wall part 42 extend along the longitudinal direction (axis x direction) of the case 40 over lengths that are identical to each other.

Each connection wall part 43 connects the outer wall part 41 and the inner wall part 42 to each other. The connection wall parts 43 are provided between the outer wall part 41 and the inner wall part 42, and are provided at positions opposite to each other in the radial direction. The connection wall parts 43 extends along the axis x (longitudinal direction) from one end to other ends of the outer wall part 41 and the inner wall part 42 along the axis x. In the case 40, the connection wall parts 43 conform to the positions of the respective openings 11.

In the case 40, between the outer wall part 41 and the inner wall part 42, two outer spaces 44 are defined by the outer wall part 41, the inner wall part 42 and the connection wall parts 43. The two outer spaces 44 have the same capacity. The outer activated carbon 51 is accommodated in the outer spaces 44.

The inner space 45, further inward in the radial direction than the inner wall part 42, is defined by the inner wall part 42. The inner activated carbon 52 is accommodated in the inner space 45.

The outer activated carbon 51 has a relatively higher adsorbing performance than the inner activated carbon 52. The outer activated carbon 51 extends along the axis x, and has a shape corresponding to the shape of the outer spaces 44 in a plan view. The outer peripheries of the outer activated carbon 51 in the outer spaces 44 are in planar contact with the outer wall part 41, the inner wall part 42 and the connection wall parts 43. The adsorbing performance of the outer activated carbon 51 is equal to or higher than 13.0 g/dl.

In a state where the outer activated carbon 51 is accommodated in the outer spaces 44 of the case 40, screen members 53 are provided at the opposite ends in the axis x. The screen members 53 are formed of non-woven fabric. The screen members 53 are accommodated together with the outer activated carbon 51 in the outer spaces 44. The screen members 53 have shapes conforming to the shapes of the outer spaces 44 in a plan view.

The inner activated carbon 52 has a relatively lower adsorbing performance than the outer activated carbon 51. The inner activated carbon 52 is formed to be columnar, and has a circular shape corresponding to the shape of the inner space 45 in a plan view. The outer periphery of the inner activated carbon 52 is in planar contact with the inner wall part 42 over the entire circumference. The adsorbing performance of the inner activated carbon 52 ranges from 6 to 10 g/dl.

In a state where the inner activated carbon 52 is accommodated in the inner space 45 of the case 40, screen members 54 are provided at the opposite ends in the axis x. The screen members 54 are formed of non-woven fabric. The screen members 54 are accommodated together with the inner activated carbon 52 in the inner space 45 of the case 40. The screen members 54 have shapes conforming to the shapes of the inner space 45 in a plan view.

The outer activated carbon 51 and the screen members 53 are charged in the outer spaces 44 of the case 40 from one end to the other end of the case 40 along the axis x. The inner activated carbon 52 and the screen members 54 are charged in a central portion in the inner space 45 of the case 40 in the axis x direction.

At an upward U portion of the case 40, the screen members 53 and 54 are supported in a downward D by a porous plate 55 made of synthetic resin. The porous plate 55 is formed to have a circular shape in a plan view. The porous plate 55 includes a disk portion 55a, and a cylindrical part 55b.

The disk portion 55a is disposed in conformity with the outer spaces 44 of the case 40, and supports the screen members 53. In the disk portion 55a, a plurality of flow holes 55c are formed to be separated from each other at regular intervals around the axis x.

The cylindrical part 55b is provided at an opening at the center of the disk portion 55a. The cylindrical part 55b protrudes in an upward U and in a downward D from the porous plate 55. A part of the cylindrical part 55b that protrudes upward U is in close contact with the inner surface of the ceiling wall part 22 of the cover 20. A part of the cylindrical part 55b that protrudes downward D enters the inside of the inner space 45 of the case 40.

The upper space 26 is defined by the upper cover 20, and the cylindrical part 55b of the porous plate 55. The purge port 25 of the ceiling wall part 22 and the cylindrical part 55b communicate with each other. In the buffer canister 1, the upper space 26 and an internal space 55d of the cylindrical part 55b are completely partitioned from each other. The internal space 55d of the cylindrical part 55b connects the outer activated carbon 51 disposed in the inner space 45 of the case 40 and the purge port 25 of the ceiling wall part of the cover 20 to each other.

The screen members 53 at a downward D portion of the case 40 are supported in an upward U by a porous plate 56 made of synthetic resin. The porous plate 56 is formed to have a circular shape in a plan view. The porous plate 56 is disposed in conformity with the outer spaces 44 of the case 40, and supports the screen members 53. The porous plate 56 has a plurality of flow holes 56a. The flow holes 56a are formed to be separated from each other at regular intervals around the axis x.

In the lower space 35 formed between the case 40 and the lower cover 30, the porous plate 56 is urged in an upward U by a spring 37 provided in a compressed state.

The screen member 54 at a downward D portion of the case 40 is supported in an upward U by a cylindrical body 57 made of synthetic resin. The cylindrical body 57 enters the inside of the inner space 45 of the case 40, and contacts the screen members 54. The cylindrical body 57 is urged upward U by a spring 38 provided in a compressed state in the lower space 35.

The heaters 60 are disposed at the openings 11 of the housing 10. The heaters 60 are provided at positions which are on the outer periphery of the outer wall part 41 exposed from the openings 11 and at which the connection wall parts 43 extend. As the heaters 60, publicly known heaters, such as electric heaters, can be used. For example, self-controllable PTC heaters and ceramic heaters can be used.

Conventionally, there has been a technical problem of efficiently heating activated carbon, which typically has a low heat-transfer coefficient, in order to increase the amount of the fuel component that is adsorbed in the activated carbon and is returned to the internal combustion engine during purging. By efficiently heating the activated carbon, desorption of the fuel component from the activated carbon is facilitated, and the amount of fuel component that remains in the activated carbon and is emitted to the atmosphere can be suppressed.

According to the buffer canister 1 as described above, with a simple configuration being adopted, the outer activated carbon 51 and the inner activated carbon 52 are efficiently heated in a short time, and the activated carbon can be efficiently charged in the case 40.

The case 40 of the buffer canister 1 includes the outer wall part 41, and the inner wall part 42, and is formed to have a double cylindrical shape. The heat from the heaters 60 provided on the outer wall part 41 is transferred to the entire outer wall part 41, which can heat the entire outer activated carbon 51 accommodated in the outer spaces 44.

Furthermore, the heaters 60 are provided at positions on the connection wall parts 43. The heat from the heaters 60 can be transferred to the inner wall part 42 through the connection wall parts 43. In the case 40, transfer can be effectively made along the axis x to the inner wall part 42 in two directions through the connection wall parts 43. Consequently, the heat from the heaters 60 can be effectively transferred to the inner activated carbon 52.

The inner wall part 42 and the inner activated carbon 52 are enclosed by the outer activated carbon 51 in the case 40. Accordingly, heat release from the inner activated carbon 52 is prevented, and the thermal retaining property of the inner activated carbon 52 is improved.

Figure 8:
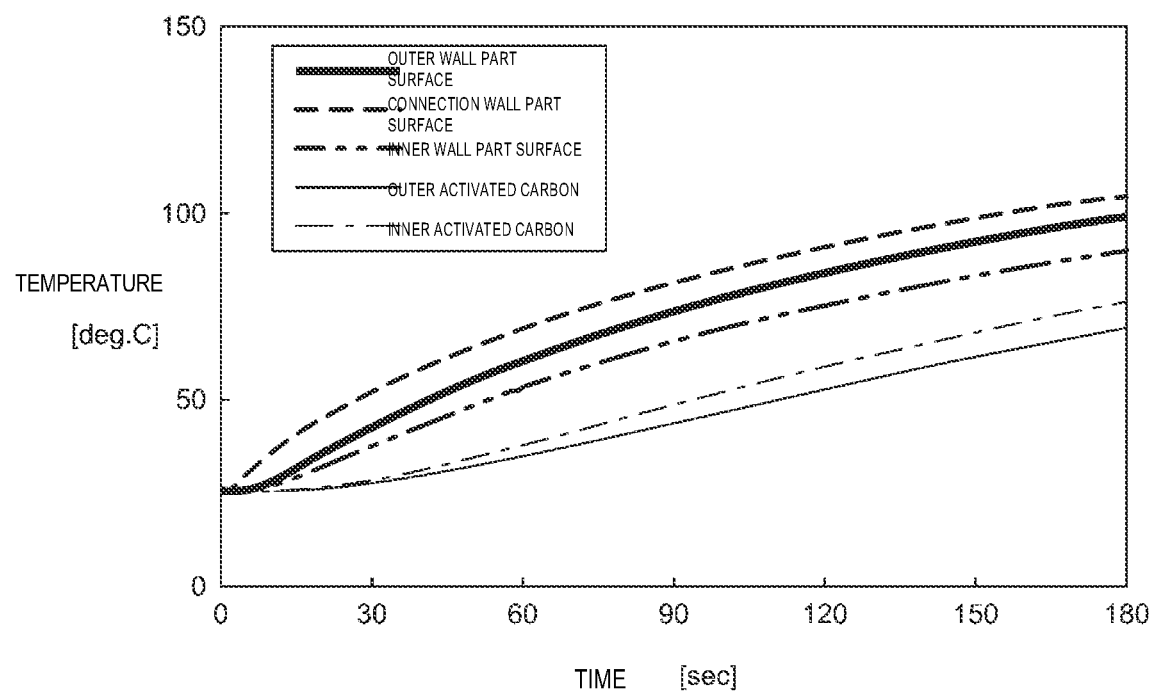
FIG. 8 is a diagram showing a characteristic curve of temperature during heating of the case.

FIG. 8 is a diagram showing a characteristic curve of temperature during heating of the case 40. Temperature measurement is performed at the outer wall part 41, the inner wall part 42, the connection wall parts 43, the outer activated carbon 51, and the inner activated carbon 52. Note that it has been known that desorption of the fuel component adsorbed in the outer activated carbon 51 and the inner activated carbon 52 is most facilitated from 50° C. to 90° C., particularly at 60° C.

As shown also in the diagram, the speed at which heat increases at the connection wall parts 43 provided with the heaters 60 is the highest. The speed of the inner activated carbon 52 accommodated in the inner space 45 of the inner wall part 42 connected to the connection wall parts 43 reaching 60° C. is higher than the speed at which the outer activated carbon 51 reaches 60° C.

In addition to the fact that the heating efficiency of the inner activated carbon 52 is higher than that of the outer activated carbon 51, the fact that the adsorbing performance of the outer activated carbon 51 is higher than the adsorbing performance of the inner activated carbon 52 is a characteristic of the buffer canister 1.

Figure 9:
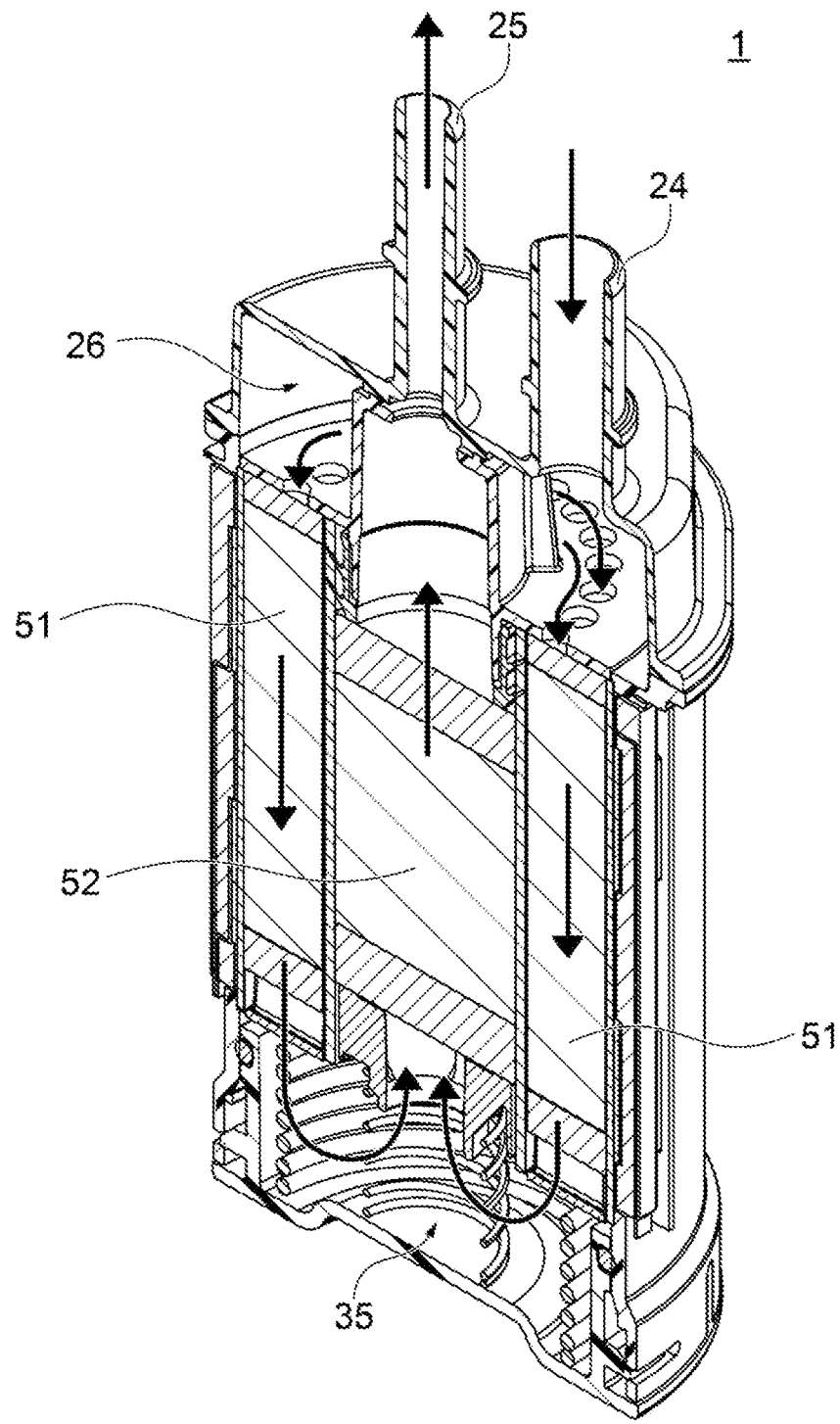
FIG. 9 is a schematic view showing the flow of evaporated fuel during adsorption (charge) of a fuel component.

FIG. 9 is a schematic view showing the flow of evaporated fuel during adsorption (charge) of the fuel component. The evaporated fuel generated in the fuel tank 139 during stop time of the internal combustion engine enters the upper space 26 of the buffer canister 1 through the charge port 24. The fuel component in the evaporated fuel is adsorbed mainly in the outer activated carbon 51. A part of the evaporated fuel passes through the outer activated carbon 51 and reaches the lower space 35. Next, the remaining evaporated fuel enters the inner space 45 of the case 40, and the fuel component is substantially entirely adsorbed in the inner activated carbon 52.

Figure 10:
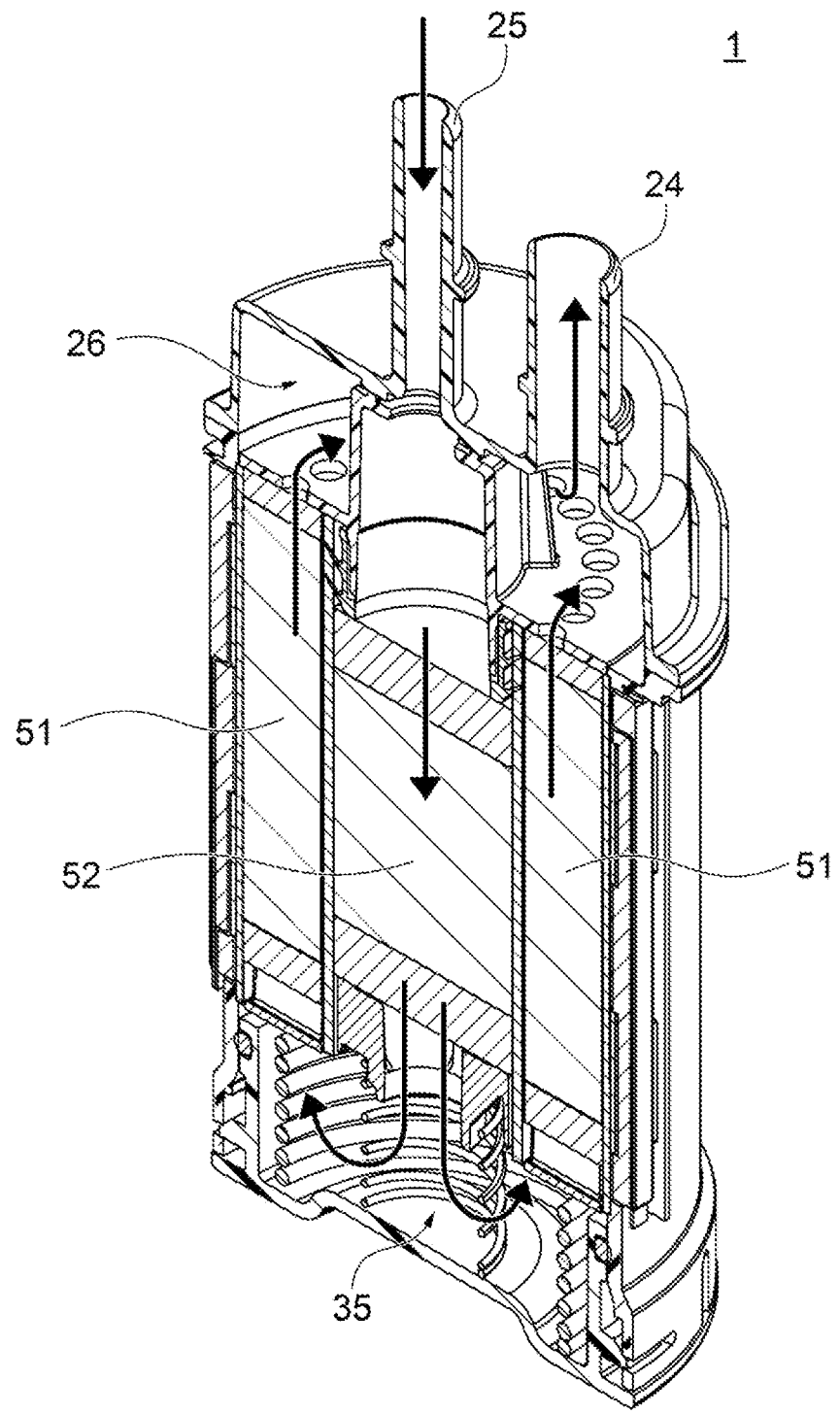
FIG. 10 is a schematic view showing the flow of air during desorption (purge) of a fuel component.

FIG. 10 is a schematic view showing the flow of air during desorption (purge) of the fuel component. By the negative pressure generated during driving of the internal combustion engine in a stop state, air is taken into the buffer canister 1 through the purge port 25. With the aforementioned air, the fuel component adsorbed in the inner activated carbon 52 is desorbed. Next, the air including the desorbed fuel component passes through the lower space 35 and then passes through the outer activated carbon 51. The air adsorbs the fuel component adsorbed in the outer activated carbon 51, and is transferred toward the internal combustion engine from the charge port 24. That is, on the path from the fuel tank 139 of the vehicle to the outside of the vehicle, the outer spaces 44 of the case 40 and the outer activated carbon 51 are disposed nearer to the fuel tank 139 (upstream side) than the inner space 45 of the case 40 and the inner activated carbon 52.

As described above, in the buffer canister 1, first, the evaporated fuel having entered the upper space 26 passes through the outer spaces 44 of the case 40. Accordingly, it is preferable that the outer activated carbon 51 having a high adsorbing performance be provided in the outer spaces 44.

As for the flow of the evaporated fuel during charging, the amount of fuel component adsorbed in the inner activated carbon 52, which resides on the downstream side of the outer activated carbon 51, is smaller than the amount of fuel component adsorbed in the outer activated carbon 51. Accordingly, the adsorbing performance of the inner activated carbon 52 may be lower than the adsorbing performance of the outer activated carbon 51. The main function required for the inner activated carbon 52 residing on a side nearer to the atmosphere in the direction from the internal combustion engine toward the atmosphere is to prevent the fuel component from being emitted to the atmosphere. Accordingly, the fuel component is intended to be desorbed efficiently from the inner activated carbon 52. In the case 40, the heat from the heaters 60 can be efficiently transferred to the inner wall part 42, which accommodates the inner activated carbon 52, through the connection wall parts 43. Accordingly, the inner activated carbon 52 can be efficiently heated.

Although the preferred embodiment of the present invention has been thus described, the present invention is not limited to the aforementioned embodiment, and includes all modes encompassed in the concept and the claims of the present invention. To solve and achieve at least a part of the aforementioned problems and advantageous effects, the components may be appropriately combined. For example, the shape, material, arrangement, size and the like of each configuration element in the embodiment described above may be appropriately changed in conformity with specific use modes of the present invention. For example, in the embodiment described above, the activated carbons 50 are not specifically limited. A honeycomb adsorbent formed of a porous material, such as powdered activated carbon, to have hollow cylindrical shapes may be used as the inner activated carbon 52. The honeycomb adsorbent is, for example, a cylindrical adsorbent that has a honeycomb structure wherein grid-shaped thin walls are internally formed on a section intersecting with the axis x.

The heaters 60 in the embodiment described above are provided along the connection wall parts 43, but may be wrapped over the entire outer periphery of the outer wall part 41. Accordingly, the case 40 and the activated carbons 50 can be entirely and further efficiently heated.

In the embodiment described above, the heaters 60 are provided. Alternatively, the case 40 itself may be used as an electrode, which can further improve the heat transfer efficiency.

The outer wall part 41 of the case 40 may be covered with a heat insulation material. Accordingly, the heat released from the outer wall part 41 can be suppressed, and the heating efficiency and the heat retaining property of the case 40 are improved.

Figure 11:
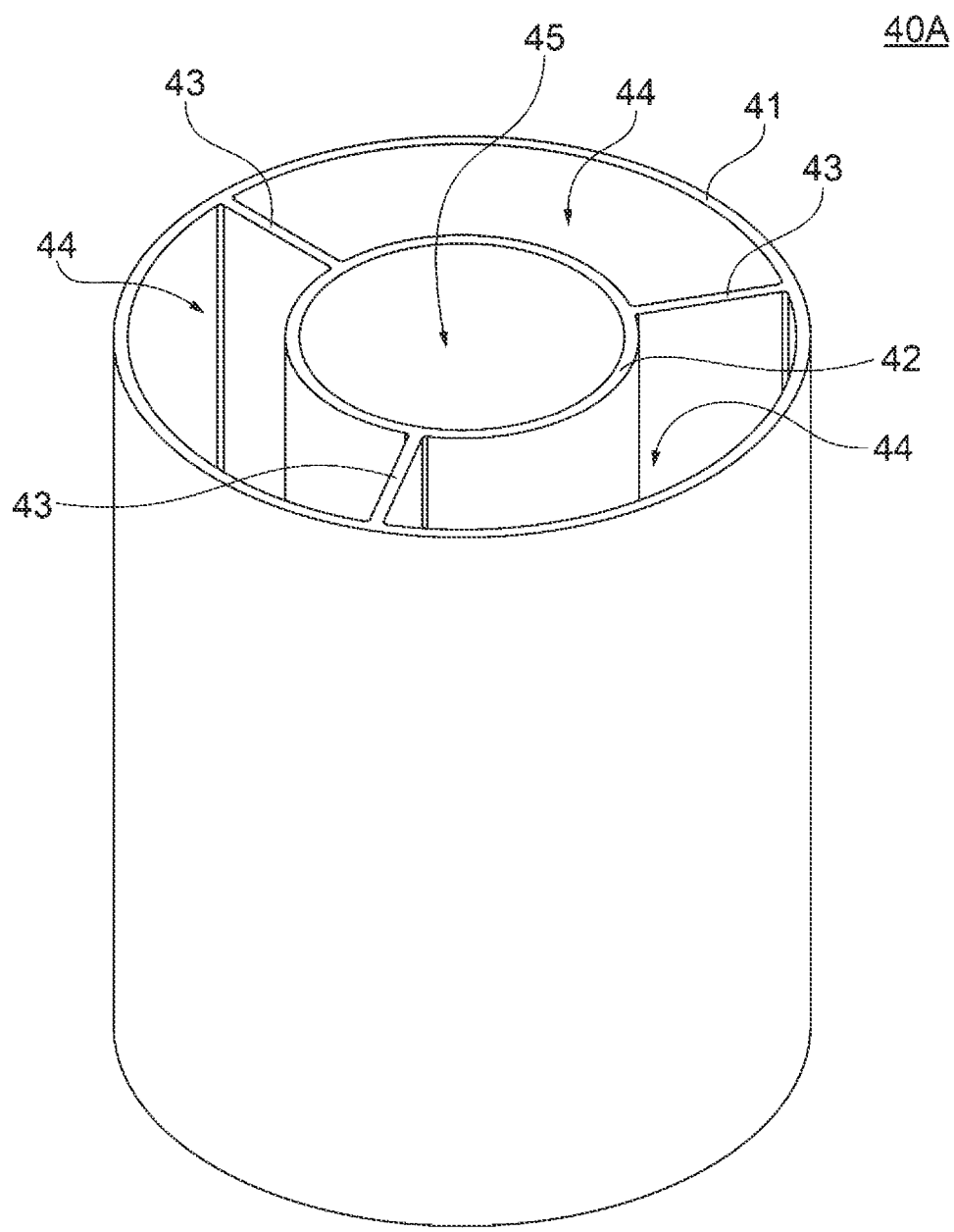
FIG. 11 is a perspective view of a case according to variant 1.

The configuration of the case 40 is not limited to the embodiment described above. FIG. 11 is a perspective view of a case 40A according to variant 1. In the case 40 in the embodiment described above, the two connection wall parts 43 are provided. However, the case 40A includes three connection wall parts 43. The connection wall parts 43 are provided separately from each other at regular intervals. By the three connection wall parts 43, the number of transfer paths of heat from the heaters 60 to the outer activated carbon 51 and the inner activated carbon 52 increases, and the outer activated carbon 51 and the inner activated carbon 52 can be heated more quickly. Accordingly, desorption of the fuel component from the inner activated carbon 52 can be facilitated.

Figure 12:
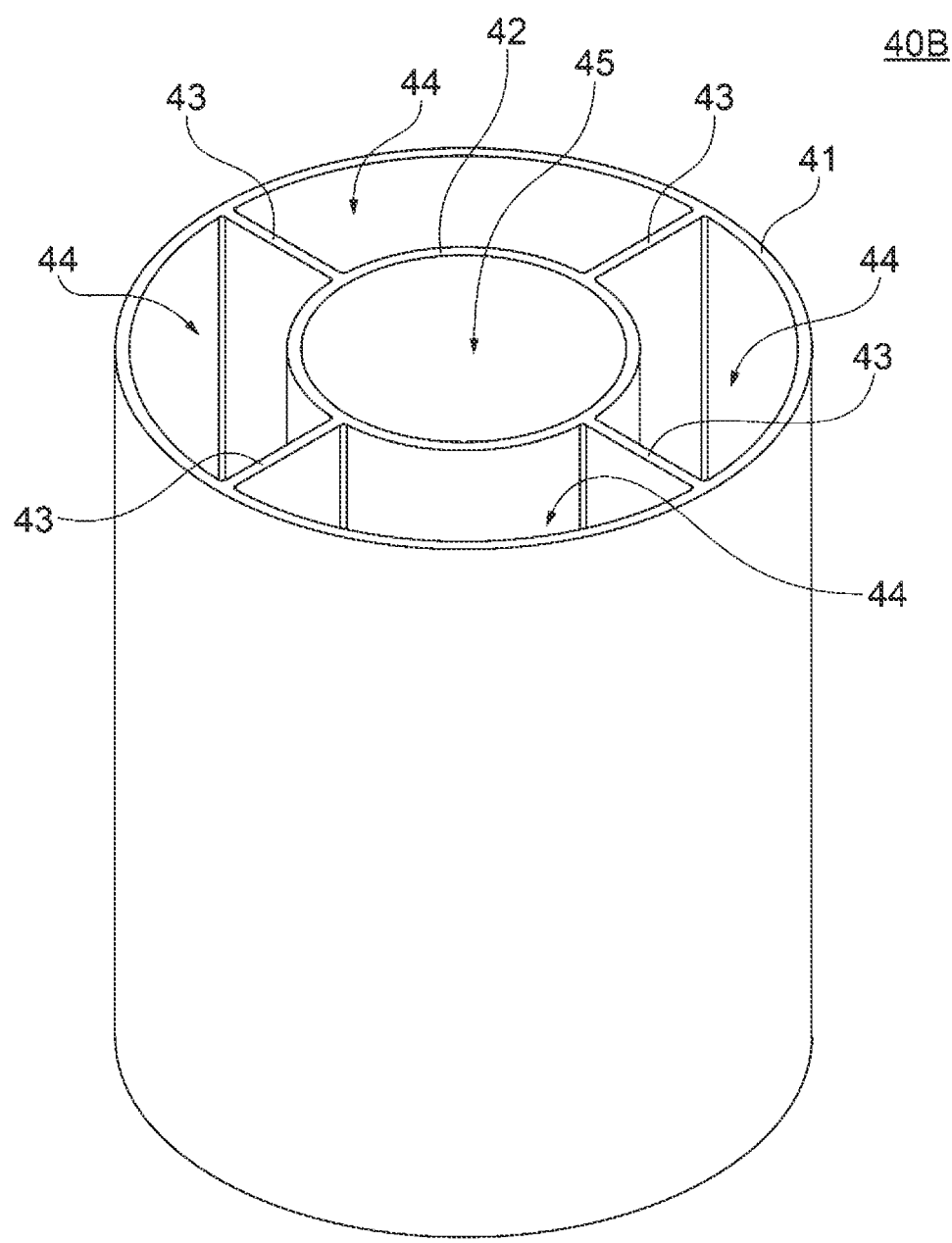
FIG. 12 is a perspective view of a case according to variant 2.

FIG. 12 is a perspective view of a case 40B according to variant 2. The case 40B includes four connection wall parts 43. The connection wall parts 43 are provided separately from each other at regular intervals. By the four connection wall parts 43, the number of transfer paths of heat from the heaters 60 to the outer activated carbon 51 and the inner activated carbon 52 increases, and the outer activated carbon 51 and the inner activated carbon 52 can be heated much more quickly. Accordingly, desorption of the fuel component from the inner activated carbon 52 can be further facilitated.

Figure 13:
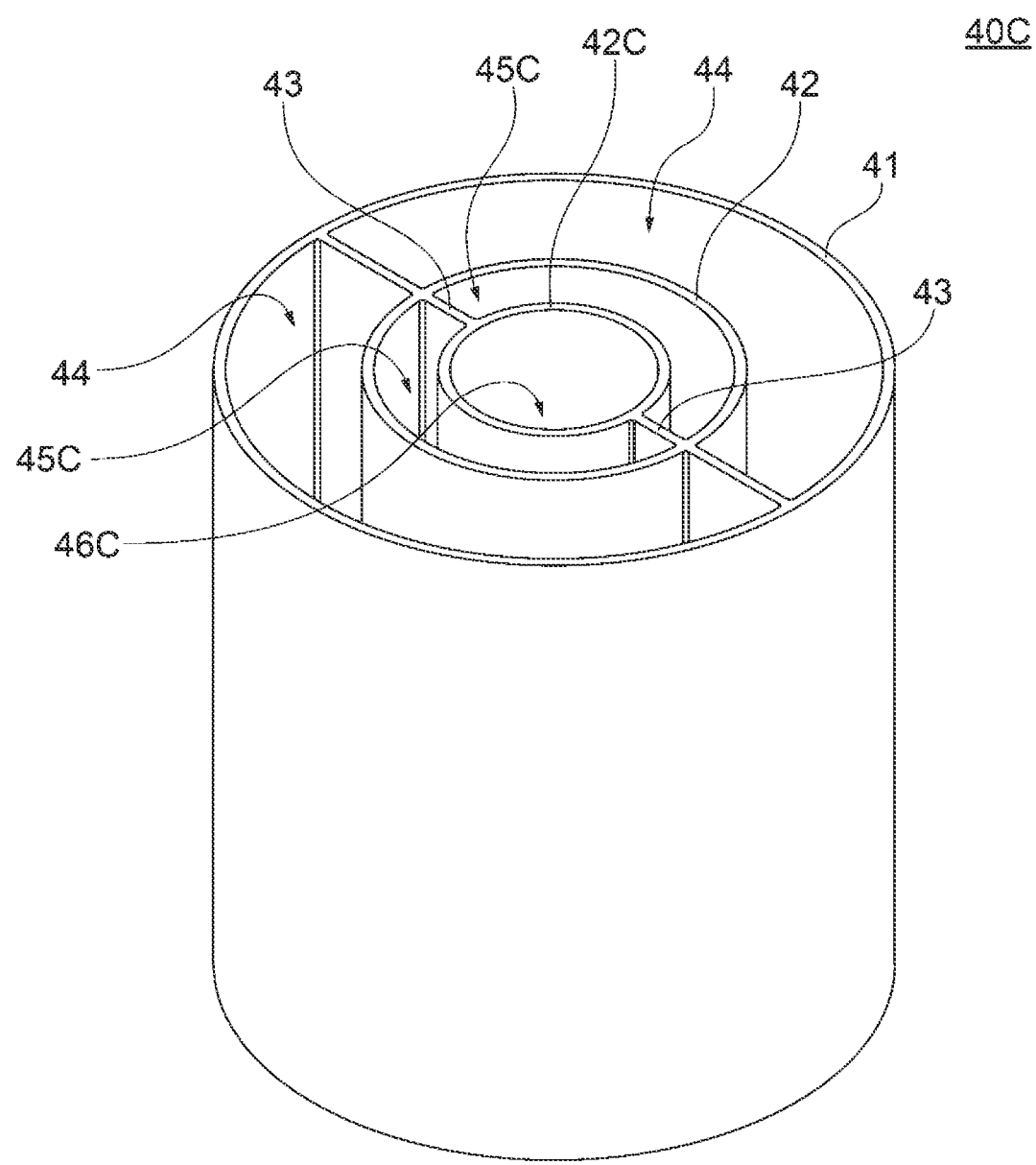
FIG. 13 is a perspective view of a case according to variant 3.

FIG. 13 is a perspective view of a case 40C according to variant 3. The case 40 of the embodiment described above has a double-wall structure including the outer wall part 41 and the inner wall part 42. However, the case 40C has a triple-wall structure. The case 40C includes a second inner wall part 42C further inward than the inner wall part 42. The second inner wall part 42C is cylindrically formed. The outer wall part 41, the inner wall part 42, and the second inner wall part 42C are arranged concentrically with each other. The diameter of the second inner wall part 42C is smaller than the diameter of the inner wall part 42. The connection wall parts 43 extend to the outer periphery of the second inner wall part 42C.

The inner wall part 42, the second inner wall part 42C and the connection wall parts 43 define two inner spaces 45C. The inner spaces 45C accommodate inner activated carbon 52 having respective shapes conforming to the shapes of the inner spaces 45C. Cylindrical activated carbon is accommodated in the second space 46C, residing further inward than the second inner wall part 42C.

According to case 40C, types of activated carbon having different adsorbing performances can be accommodated in the two inner spaces 45C and the second inner space 46C.

Figure 14:
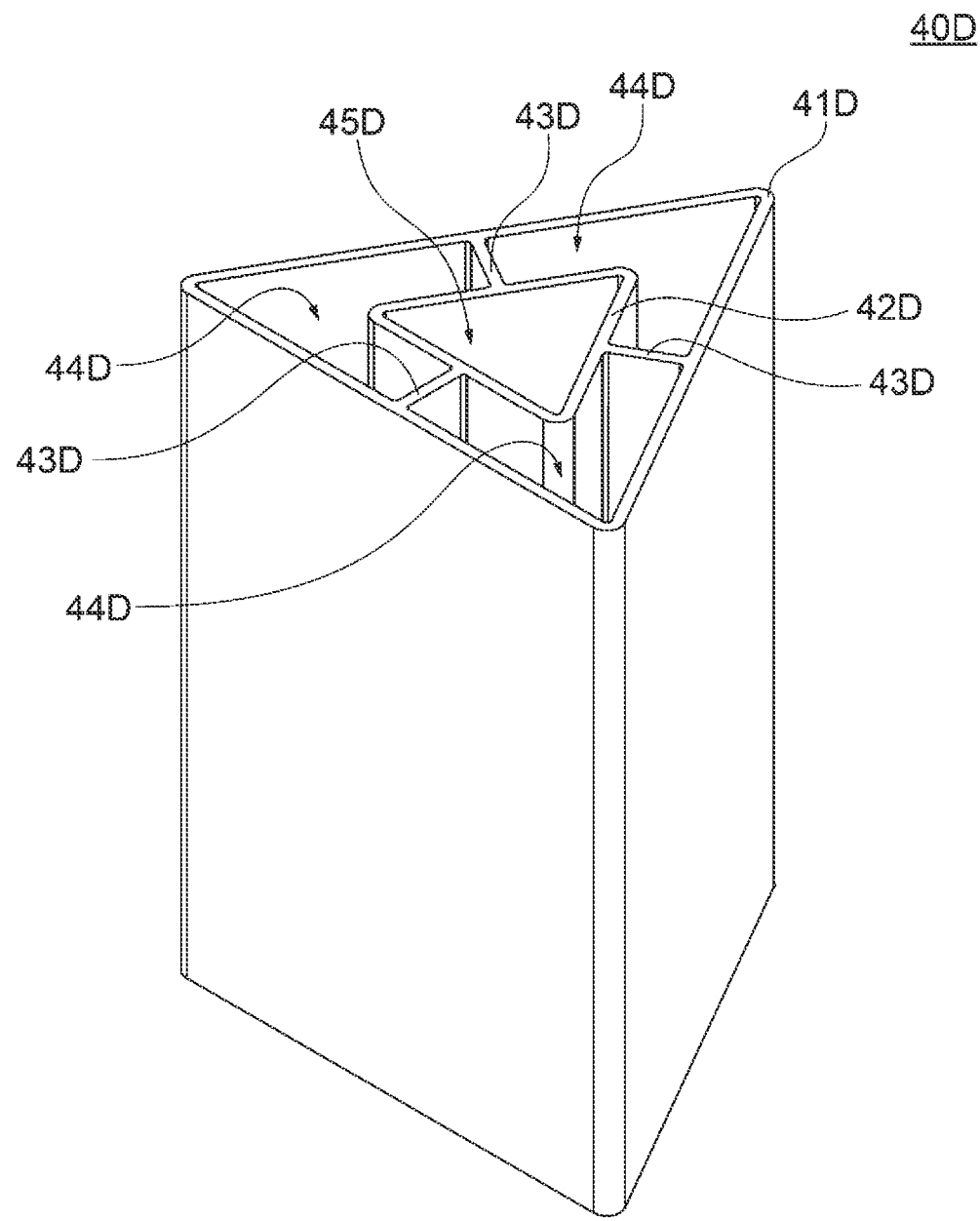
FIG. 14 is a perspective view of a case according to variant 4.

The case 40 in the embodiment described above has a circular shape in a plan view. Alternatively, a case having a polygonal shape in a plan view may be adopted. FIG. 14 is a perspective view of a case 40D according to variant 4. The planar shape of the case 40D has a triangular shape in a plan view. An outer wall part 41D and an inner wall part 42D are formed to have a cylindrical shape having a triangular shape in a plan view.

Central portions of sides of the outer wall part 41D and the inner wall part 42D are connected to each other by connection wall parts 43D. In the case 40D, between the outer wall part 41D and the inner wall part 42D, three outer spaces 44D are defined by the outer wall part 41D, the inner wall part 42D and the connection wall parts 43D. Further inward than the inner wall part 42D, an inner space 45D having a triangular shape in a plan view is defined by the inner wall part 42D.

The outer spaces 44D accommodate outer activated carbon 51 having shapes conforming to the shape of the outer spaces 44D. The inner space 45D accommodates inner activated carbon 52 having a shape conforming to the shape of the inner space 45D.

Figure 15:
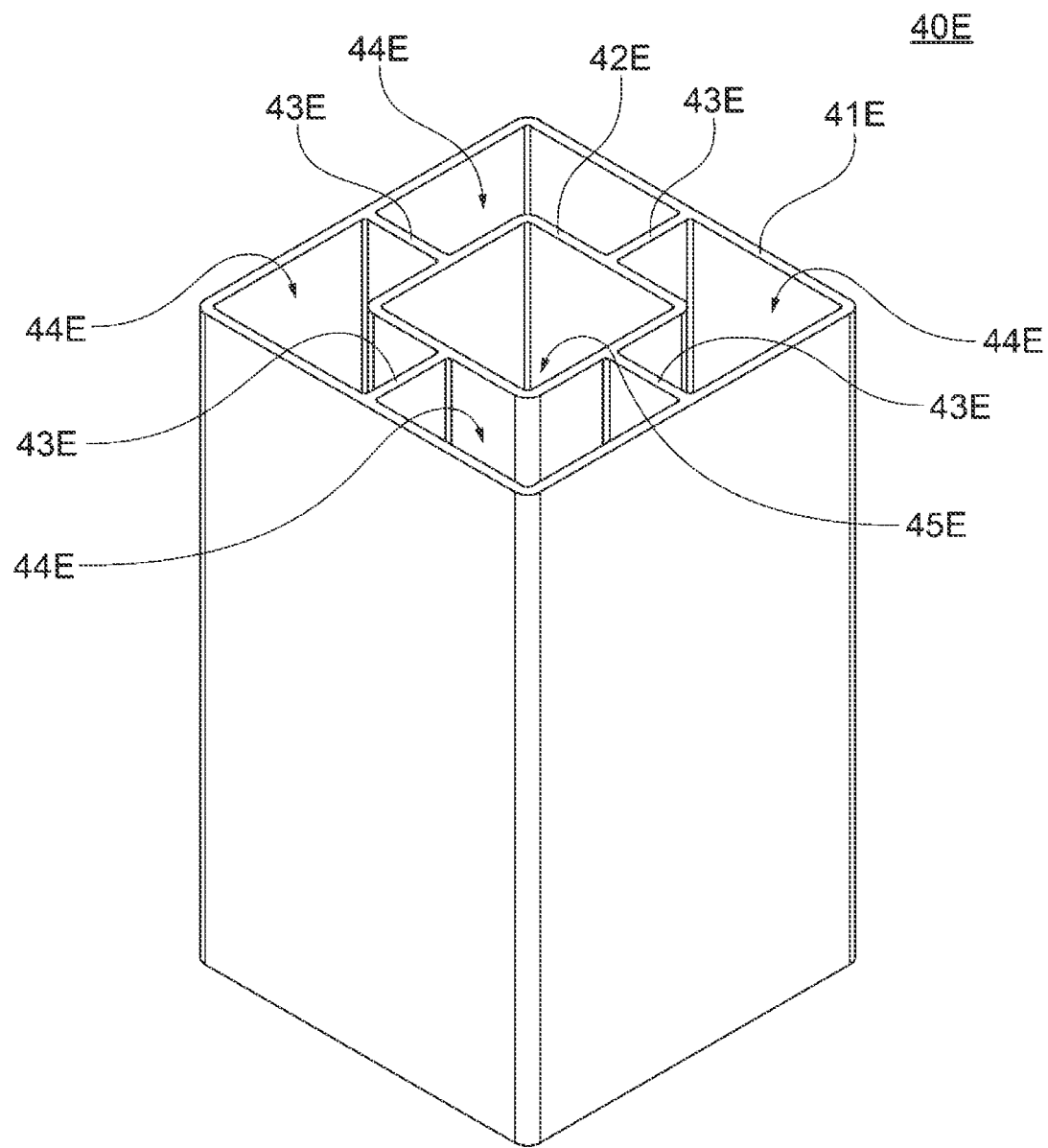
FIG. 15 is a perspective view of a case according to variant 5.

FIG. 15 is a perspective view of a case 40E according to variant 5. The planar shape of the case 40E has a rectangular shape in a plan view. An outer wall part 41E and an inner wall part 42E are each formed to have a cylindrical shape having a rectangular shape in a plan view.

Central portions of sides of the outer wall part 41E and the inner wall part 42E are connected to each other by connection wall parts 43E. In the case 40E, between the outer wall part 41E and the inner wall part 42E, four outer spaces 44E are defined by the outer wall part 41E, the inner wall part 42E and the connection wall parts 43E. Further inward than the inner wall part 42E, an inner space 45E having a rectangular shape in a plan view is defined by the inner wall part 42E.

The outer spaces 44E accommodate outer activated carbon 51 having shapes conforming to the shapes of the outer spaces 44E. The inner space 45E accommodates inner activated carbon 52 having a shape conforming to the shape of the inner space 45E.

Both of the cases 40D and 40E according to variants can exert advantageous effects identical to those in the embodiment described above. A housing that accommodates the cases 40D and 40E is formed in conformity with the shapes of the cases 40D and 40E.

REFERENCE SIGNS LIST 1 buffer canister (fuel adsorption device), 10 housing, 20 upper cover, 30 lower cover, 40 case, 41 outer wall part (first wall part), 42 inner wall part (second wall part), 43 connection wall part (connection part), 44 outer space (first space), 45 inner space (second space), 51 outer activated carbon (one adsorbent), 52 inner activated carbon (other adsorbent), 60 heater, 100 evaporated fuel processing apparatus

The invention claimed is:

1. A fuel adsorption device, comprising:
   a case composed of a metal and having a multi-cylindrical shape, the case accommodating a plurality of adsorbents configured to at least one of adsorb and desorb evaporated fuel; and
   a heater for the case;
   the case including:
      a cylindrical first wall part;
      at least one cylindrical second wall part disposed further inward than the first wall part; and
      a plurality of connection parts connecting the first wall part and the at least one second wall part to one other;
   wherein a first adsorbent of the plurality of adsorbents is arranged in a first space disposed between the first wall part and the second wall part, and a second adsorbent of the plurality of adsorbents is arranged in a second space disposed further inward than the second wall part; and
   wherein the heater is disposed on an outer surface of the first wall part.

2. The fuel adsorption device according to claim 1, wherein the plurality of connection parts are arranged opposite each other.

3. The fuel adsorption device according to claim 1, wherein the heater is disposed at a position that is on an outer periphery of the first wall part, and wherein the plurality of connection parts extend to the position of the heater.

4. The fuel adsorption device according to claim 1, wherein the plurality of connection parts extend along a longitudinal direction from one end of each of the first wall part and the at least one second wall part to another end thereof.

5. The fuel adsorption device according to claim 1, wherein:
on a path from a fuel tank of a vehicle to an outside of the vehicle, the first space is disposed closer to the fuel tank than the second space; and
the first adsorbent has a higher adsorbing performance than the second adsorbent.

6. An evaporated fuel processing apparatus, comprising:
a main canister configured to adsorb and desorb evaporated fuel from a fuel tank of a vehicle;
a buffer canister in communication with the main canister, the buffer canister configured to adsorb and desorb evaporated fuel from the main canister;
the buffer canister including a fuel adsorption device;
the fuel adsorption device including:
a heater;
a case composed of a metal and having a multi-cylindrical shape, the case accommodating a plurality of adsorbents configured to at least one of adsorb and desorb evaporated fuel;
the case including a cylindrical first wall part, at least one cylindrical second wall part disposed further inward than the first wall part, and a plurality of connection parts connecting the first wall part and the at least one second wall part to one other;
wherein a first adsorbent of the plurality of adsorbents is arranged in a first space disposed between the first wall part and the second wall part, and a second adsorbent of the plurality of adsorbents is arranged in a second space disposed further inward than the second wall part; and
wherein the heater is disposed on an outer surface of the first wall part.

7. The evaporated fuel processing apparatus according to claim 6, wherein the plurality of connection parts are arranged opposite each other.

8. The evaporated fuel processing apparatus according to claim 6, wherein the heater is disposed at a position that is on an outer periphery of the first wall part, and wherein the plurality of connection parts extend to the position of the heater.

9. The evaporated fuel processing apparatus according to claim 6, wherein the plurality of connection parts extend along a longitudinal direction from one end of each of the first wall part and the at least one second wall part to another end thereof.

10. The evaporated fuel processing apparatus according to claim 6, wherein:
on a path from a fuel tank of a vehicle to an outside of the vehicle, the first space is disposed closer to the fuel tank than the second space; and
the first adsorbent has a higher adsorbing performance than the second adsorbent.

11. The evaporated fuel processing apparatus according to claim 6, wherein:
the plurality of connection parts are arranged opposite each other;
the heater is disposed at a position that is on an outer periphery of the first wall part;
the plurality of connection parts extend to the position of the heater;
the plurality of connection parts extend along a longitudinal direction from one end of each of the first wall part and the at least one second wall part to another end thereof;
on a path from a fuel tank of a vehicle to an outside of the vehicle, the first space is disposed closer to the fuel tank than the second space; and
the first adsorbent has a higher adsorbing performance than the second adsorbent.

12. The fuel adsorption device according to claim 2, wherein the heater is disposed at a position that is on an outer periphery of the first wall part, and wherein the plurality of connection parts extend to the position of the heater.

13. The fuel adsorption device according to claim 12, wherein the plurality of connection parts extend along a longitudinal direction from one end of each of the first wall part and the at least one second wall part to another end thereof.

14. The fuel adsorption device according to claim 13, wherein:
on a path from a fuel tank of a vehicle to an outside of the vehicle, the first space is disposed closer to the fuel tank than the second space; and
the first adsorbent has a higher adsorbing performance than the second adsorbent.

15. The fuel adsorption device according to claim 2, wherein the plurality of connection parts extend along a longitudinal direction from one end of each of the first wall part and the at least one second wall part to another end thereof.

16. The fuel adsorption device according to claim 2, wherein:
on a path from a fuel tank of a vehicle to an outside of the vehicle, the first space is disposed closer to the fuel tank than the second space; and
the first adsorbent has a higher adsorbing performance than the second adsorbent.

17. The fuel adsorption device according to claim 3, wherein the plurality of connection parts extend along a longitudinal direction from one end of each of the first wall part and the at least one second wall part to another end thereof.

18. The fuel adsorption device according to claim 17, wherein:
on a path from a fuel tank of a vehicle to an outside of the vehicle, the first space is disposed closer to the fuel tank than the second space; and
the first adsorbent has a higher adsorbing performance than the second adsorbent.

19. The fuel adsorption device according to claim 3, wherein:
on a path from a fuel tank of a vehicle to an outside of the vehicle, the first space is disposed closer to the fuel tank than the second space; and
the first adsorbent has a higher adsorbing performance than the second adsorbent.

20. The fuel adsorption device according to claim 4, wherein:
on a path from a fuel tank of a vehicle to an outside of the vehicle, the first space is disposed closer to the fuel tank than the second space; and the first adsorbent has a higher adsorbing performance than the second adsorbent.

* * * * *